(12) United States Patent
Madan et al.

(10) Patent No.: US 11,317,289 B2
(45) Date of Patent: Apr. 26, 2022

(54) AUDIO COMMUNICATION TOKENS

(71) Applicant: Google LLC, Mountain View, CA (US)

(72) Inventors: Arjita Madan, Andhra Pradesh (IN); Sumit Gwalani, Maharashtra (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/645,319

(22) PCT Filed: Jun. 15, 2018

(86) PCT No.: PCT/US2018/037776
§ 371 (c)(1),
(2) Date: Mar. 6, 2020

(87) PCT Pub. No.: WO2019/050591
PCT Pub. Date: Mar. 14, 2019

(65) Prior Publication Data
US 2020/0314654 A1    Oct. 1, 2020

Related U.S. Application Data

(60) Provisional application No. 62/555,434, filed on Sep. 7, 2017.

(51) Int. Cl.
*H04W 12/106*    (2021.01)
*H04W 76/10*     (2018.01)
(Continued)

(52) U.S. Cl.
CPC .......... *H04W 12/106* (2021.01); *H04H 60/58* (2013.01); *H04H 60/80* (2013.01); *H04W 12/06* (2013.01); *H04W 76/10* (2018.02)

(58) Field of Classification Search
CPC . H04W 12/1006; H04W 12/06; H04W 76/10; H04W 12/08; H04W 4/80;
(Continued)

(56) References Cited

U.S. PATENT DOCUMENTS 9,648,006 B2 * 5/2017 Lawson .................. H04L 67/02
2012/0214416 A1    8/2012 Kent et al.
(Continued)

FOREIGN PATENT DOCUMENTS

CN    106709715    8/2012
CN    102971758    3/2015
(Continued)

OTHER PUBLICATIONS

International Search Report and Written Opinion for PCT/US2018/037776, dated Aug. 29, 2018, 3 pages.
(Continued)

*Primary Examiner* — Magdi Elhag
(74) *Attorney, Agent, or Firm* — Dority & Manning, P.A.

(57) ABSTRACT

A first device listens for a communication token across an audio bandwidth covering a transmit frequency one or more audio frequency broadcasting device. The first device receives at least one token broadcast from the one or more broadcasting devices. The first device demodulates and decodes each received token. One or more computing devices validates each decoded token. The first device determines, based on the validating, a broadcasting device of the broadcasting devices with which to establish a communications channel. The one or more computing devices generates a response token based on the token received from the determined device. The first device broadcasts the generated response token in a response band of the determined device. The determined device demodulates decodes, and validates the token broadcast from the first device. Upon determining the token broadcast from the first device valid, the first device and the determined device establish a wireless communication channel.

18 Claims, 3 Drawing Sheets

(51) Int. Cl.
*H04W 12/06* (2021.01)
*H04H 60/58* (2008.01)
*H04H 60/80* (2008.01)

(58) Field of Classification Search
CPC ... H04W 48/16; H04W 8/005; H04W 12/003; H04W 76/14; H04W 12/106; H04W 12/0431; H04W 12/50; H04W 12/60; H04W 12/069; H04W 12/69; H04W 12/72; H04W 12/0471; H04H 60/58; H04H 60/80
See application file for complete search history.

(56) References Cited

U.S. PATENT DOCUMENTS

| | | | | |
|---|---|---|---|---|
| 2013/0143498 | A1* | 6/2013 | Niemi | H04L 41/28 455/41.2 |
| 2014/0222574 | A1* | 8/2014 | Emigh | G06Q 30/0261 705/14.58 |
| 2016/0072803 | A1* | 3/2016 | Holz | H04W 12/06 726/7 |
| 2016/0119299 | A1 | 4/2016 | Amulothu et al. | |
| 2016/0366713 | A1* | 12/2016 | Sonnino | G09G 5/12 |
| 2017/0034149 | A1* | 2/2017 | Kang | H04L 63/083 |
| 2018/0091565 | A1* | 3/2018 | Arsenault | G06F 21/30 |
| 2018/0293571 | A1* | 10/2018 | Chiang | H04W 4/35 |
| 2020/0034521 | A1* | 1/2020 | Teng | H04W 12/06 |

FOREIGN PATENT DOCUMENTS

| | | |
|---|---|---|
| CN | 104901957 | 9/2015 |
| CN | 104427471 | 5/2017 |
| WO | WO 2017/027487 | 2/2017 |

OTHER PUBLICATIONS

Marjakangas, "Audio-Based Device Discovery and Paring in Smart Urban Spaces", University of Oulu, Department of Electrical Engineering, Electrical Engineering Master's Thesis, Apr. 2015, 80 pages.

* cited by examiner

AUDIO COMMUNICATION TOKENS

CROSS REFERENCE TO RELATED APPLICATIONS

This application is based upon and claims the right of priority under 35 U.S.C. § 371 to International Application No. PCT/US2018/037776, filed on Jun. 15, 2018, which claims the benefit of U.S. Provisional Patent Application No. 62/555,434, filed Sep. 7, 2017 and entitled "Audio Communication Tokens,". Applicant claims priority to and the benefit of each of such applications and incorporates all such applications herein by reference in their entirety.

TECHNICAL FIELD

The technology disclosed herein is related to using audio communication tokens for establishing a wireless communication channel between at least a first device and a second device. Examples relate to using audio communication tokens in conjunctions with mobile banking and mobile peer-to-peer payments.

BACKGROUND

Identity and access management (IAM) involves controlling access to resources (including e.g., computing resources and physical spaces), including access to functions of those resources. IAM addresses the need to ensure appropriate access to resources across increasingly heterogeneous technology environments and to meet increasingly rigorous compliance requirements.

As of 2016, only thirteen percent of the U.S. adult population does not have a mobile phone. In most places outside the U.S., especially jurisdictions where a landline telecommunications infrastructure was not ubiquitous, more people have mobile phones than have access to landline phones. For example, India has vast non-banking population, many of whom reside in the rural areas and are cut off from access to basic financial services from a trusted source. However, as of 2012, India had nearly a billion mobile phone customers, many of whom access financial services via their mobile phones.

Throughout the world, mobile computing devices are being used to access functions and services, such as financial services. IAM directed to such access via mobile computing devices is an important aspect of offering such services.

SUMMARY

The technology described herein includes computer-implemented methods, computer program products, and systems to control wireless access to target devices. In some examples, a first device listens for a communication token across an audio bandwidth covering a transmit frequency one or more audio frequency broadcasting device. The first device receives at least one token broadcast from the one or more broadcasting devices. The first device demodulates and decodes each received token. One or more computing devices validates each decoded token. The first device determines, based on the validating, a broadcasting device of the broadcasting devices with which to establish a communications channel. The one or more computing devices generates a response token based on the token received from the determined device. The first device broadcasts the generated response token in a response band of the determined device (for example, after having determined in which broadcasting band the token received from the determined device has been transmitted). The determined device demodulates decodes, and validates the token broadcast from the first device. Upon determining the token broadcast from the first device valid, the first device and the determined device establish a wireless communication channel. In some examples, the response band may just a part/sub-channel of the audio bandwidth across which the first device listens for a communication token.

In some examples, listening includes listening across the audio bandwidth a plurality of broadcasting devices, and at least two broadcasting devices broadcast in different bands. In some examples, the one or more computing devices generating a response token is a token verification server other than the receiving device and the listening device. The token server is reachable from the first device via a radio frequency communications network. In some examples, the one or more computing devices validating each decoded token is a token verification server. In some example the wireless communication channel is a radio frequency communication channel, while in others, it is an audio-based communication channel.

In some embodiments, determining includes presenting, by the first device, the validation results for each token to a user of the first device for selection of a broadcasting device corresponding to each token to pair with. Is such examples, the first device receives, from the user, selection of a broadcast device in response to the presenting of validation results. In some embodiments, use of audio communication tokens is proposed to establish a wireless communication channel between a mobile user device and an ATM.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Tokens can be used in IAM for authentication and validation of devices to be paired for communication over a sound/audio frequency communications channel. When an audio token is transmitted, it can be appended with a signature to indicate that it is a verified token. The signature can be a hash of the content of the token plus a secret that only the server possesses. A receiving device can be programmed to first check the signature to validate that the audio token is from a verified source before trying to take action or redirect the user.

In some embodiments of the technology disclosed herein, the audio token and audio communication channel are used to initiate a radio frequency channel between devices, and a server is used to verify the signature of the audio token.

By using and relying on the methods and systems described herein, the technology disclosed hereon uses audio communication channels, and tokens thereof, to establish another communication channel (either audio or radio frequency) between two devices based the audio tokens. As such, the systems and methods described herein may be employed to control the establishment of communication channels between devices and reduce the risk of unauthorized channels. Hence the technology described herein can be use to establish secure communications between devices such as a user's mobile phone and an automated teller machine (ATM).

Embodiments of the present technology include methods, systems, and computer program products to use audio communication tokens for establishing a communication channel.

Example System Architectures

Figure 1:
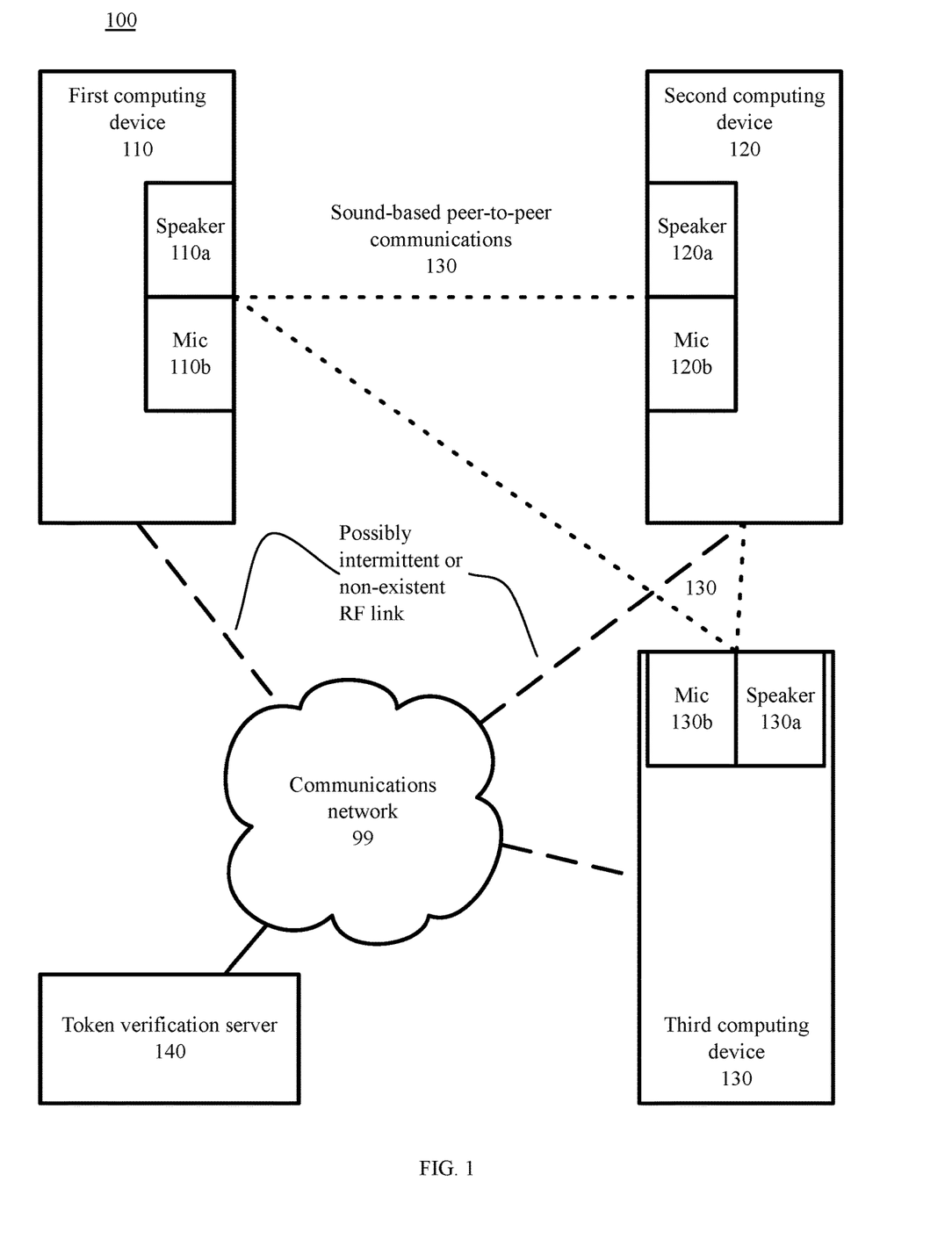
FIG. 1 is a block diagram depicting an operating environment to establish wireless communication channels between two devices, in accordance with certain examples.

FIG. 1 is a block diagram depicting a communications and processing operating environment 100 to establish wireless communication channels between two devices, in accordance with certain examples. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes network devices 110, 120, 130, and 140; each of which may be configured to communicate with one another via communications network 99. In some embodiments, a user associated with a device must install an application and/or make a feature selection to obtain the benefits of the technology described herein. In some embodiments, devices 110, 120, and 130 include both a speaker 110a, 120a, 130a and a microphone 110b, 120b, 130b.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system, that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, 130, and 140 can, where so configured, include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, network device 110 is not configured to communicate over network 99.

The network connections illustrated are examples and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, computing devices 110 and 120 each may be embodied as a mobile phone or handheld computer and may not include all the components described above.

In examples described herein, computing device 110 is a mobile phone with a speaker 110a and a microphone 110b; computing devices 120 and 130 are point of sale devices (which can be mobile phones also) with at least a speaker 120b, 130b; and token verification server 140 is a server (whether physical or virtual) with network 99 access. In some such example embodiments, computing devices 110, 120, and 130 have at least intermittent network 99 connectivity.

In the examples described herein, sound-based peer-to-peer communications 150 are operative when at least one broadcasting device, such as device 120, is in the near vicinity, for example 2-10 feet, of at least one receiving device, such as device 110.

Figure 3:
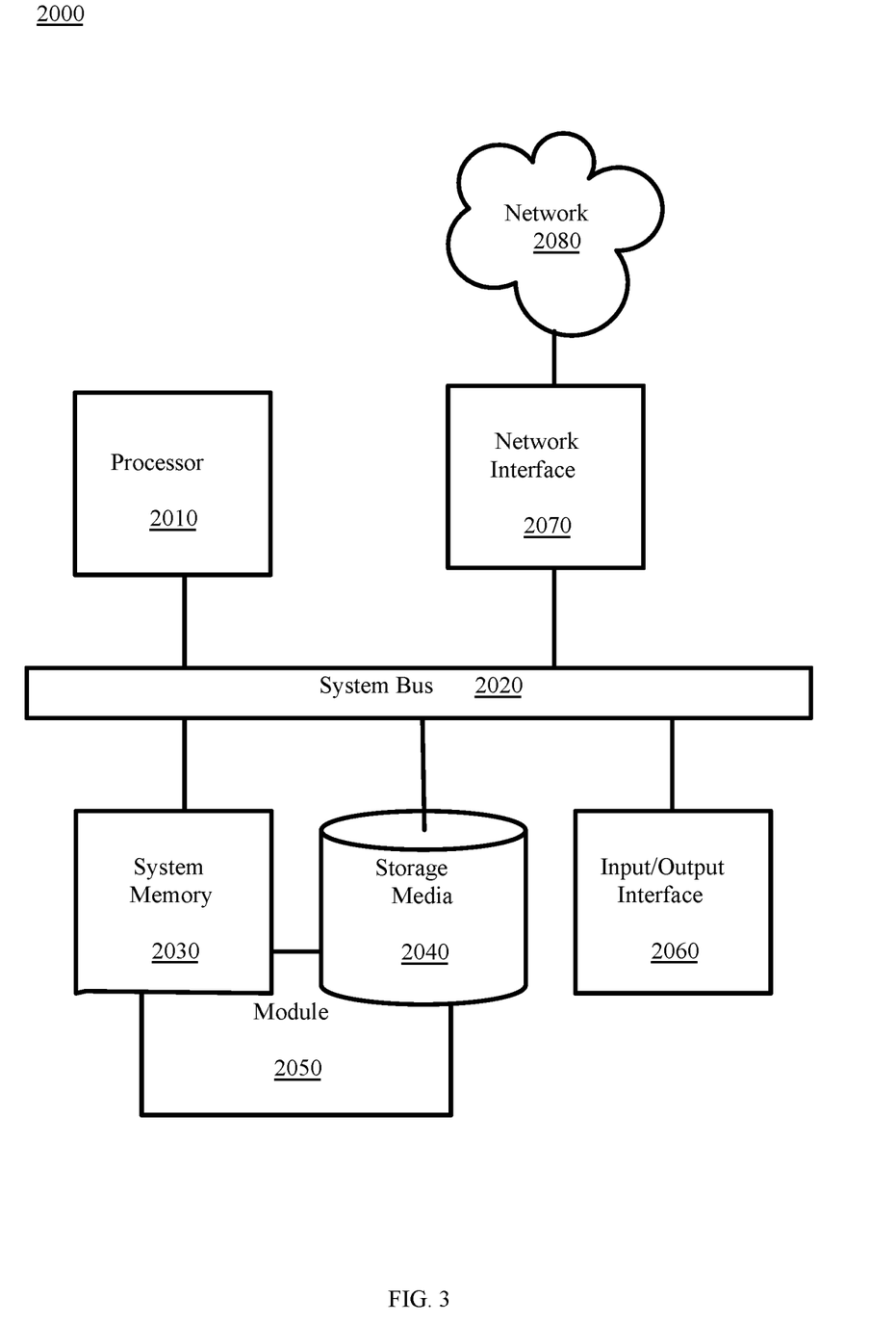
FIG. 3 is a block diagram depicting a computing machine and a module, in accordance with certain examples.

In example embodiments, the network computing devices, and any other computing machines associated with the technology presented herein, may be any type of computing machine such as, but not limited to, those discussed in more detail with respect to FIG. 3. Furthermore, any modules associated with any of these computing machines, such as modules described herein or any other modules (scripts, web content, software, firmware, or hardware) associated with the technology presented herein may be any of the modules discussed in more detail with respect to FIG. 3. The computing machines discussed herein may communicate with one another as well as other computer machines or communication systems over one or more networks, such as network 99. The network 99 may include any type of data or communications network, including any of the network technology discussed with respect to FIG. 3.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
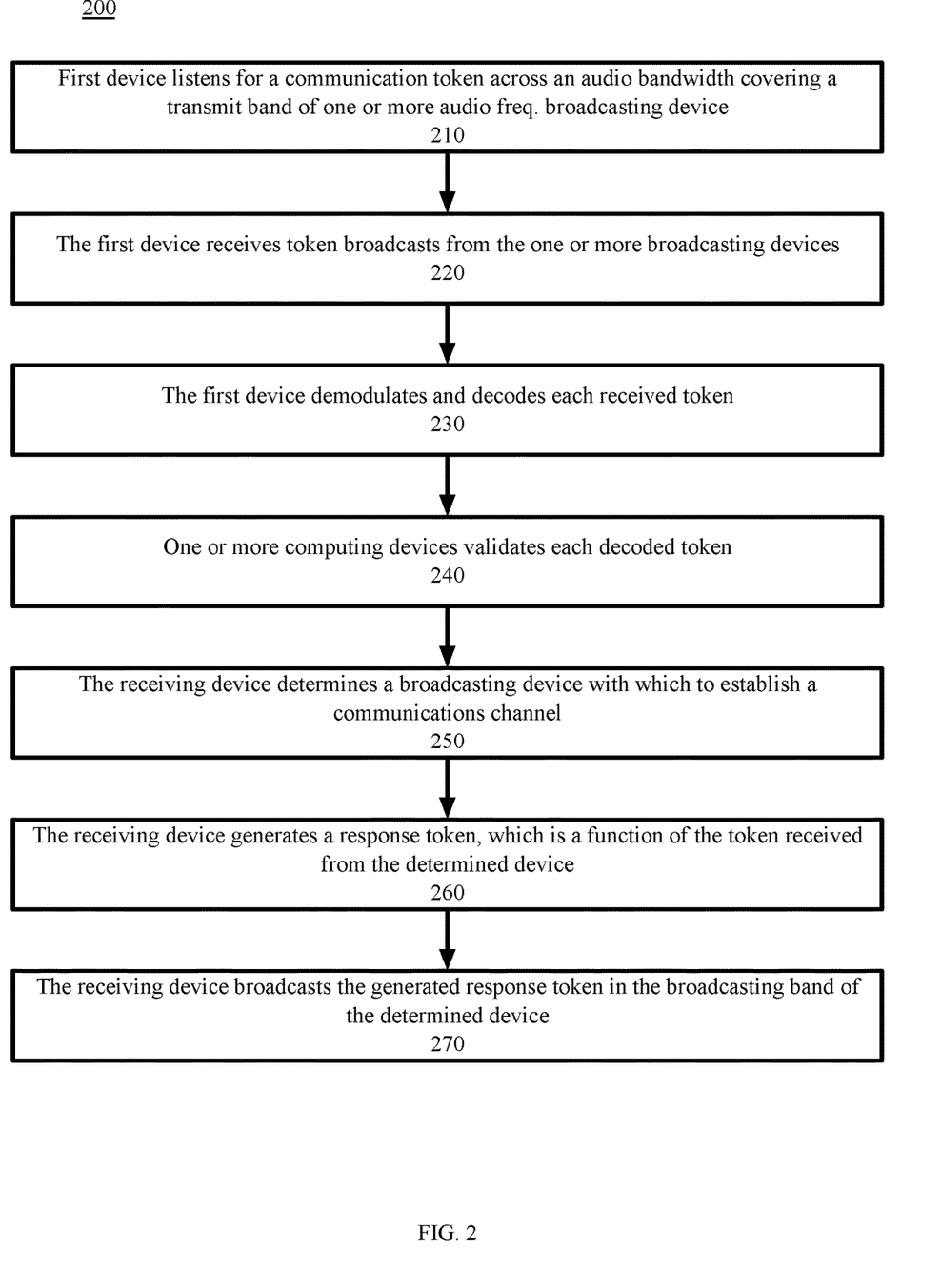
FIG. 2 is a block diagram illustrating methods to establish wireless communication channels between two devices, in accordance with certain examples.

Referring to FIG. 2, and continuing to refer to FIG. 1 for context, methods 200 to use audio communication tokens to establish wireless communication channels between two devices are illustrated, in accordance with certain examples.

In such methods 200, a first device 110 listens for a communication token across an audio bandwidth covering a transmit frequency of at least one audio frequency broadcasting device, for example device 120 and device 130—Block 210.

As a continuing example, consider: Device B 120 broadcasting within a frequency band of 5.0-10.0 kHz; Device C 130 broadcasting within a frequency band of 10.0-15.0 kHz; and Device A 110 listening in a frequency band of 1.0 to 20.0 kHz. Device B 120 and Device C 130 are side-by-side ATMs and Device A 110 is a user mobile telephone.

The first device 110 receives token broadcasts from the one or more broadcasting devices, for example device 120 and device 130—Block 220. In the continuing example, the token being broadcast by ATM B 120 represents the word "apple", converted into binary format and encoded using an audio encoding scheme, such as Direct Sequence Spread Spectrum (DSSS) or Binary Phase Shift Keying (BPSK). The token broadcast by ATM C 130 represents the word "banana," and as with the token broadcast by ATM B, is converted into binary format and encoded using an audio encoding scheme, such as DSSS or BPSK.

In the continuing example, user mobile telephone A 110 receives the "apple" token from ATM B 120 frequency band of 5.0-10.0 kHz, and the "banana" token from ATM C 130 in the frequency band of 10.0-15.0 kHz (and thus in both cases over different frequency bands which in each case are parts/sub-channel of the bandwidth across which the user mobile telephone A 110 listens for tokens).

The first device 110 demodulates and decodes each received token—Block 230. In the continuing example, user mobile telephone A 110 demodulates and decodes the audio frequency tokens received from ATM B 120 and from ATM C 130. In some examples, one or both of demodulation and decoding of the token is performed by a separate device, for example, token validation server 140 if a communications channel is available between device 110 and device 140 via network 99.

One or more computing devices validates each decoded token—Block 240. In a first variation, the decoding device, user mobile telephone A 110, determines the validity of the decoded token. In a second variation, the decoding device 110, user mobile telephone A 110, communicates the decoded token to a server, such as token validation server 140 (either in the clear or in a secure fashion, for example, encrypted or over an otherwise secure channel) over communication network 99 when such communication network is available.

In the continuing example, using the first variation, user mobile telephone A 110, determines the validity of the decoded tokens on user mobile telephone A 110. The token from ATM B 120 is found to have an invalid signature (for example, not matching the signature originally added by the token creator), and the token from ATM C 130 is found to have a valid signature.

In the continuing example, using the second variation, user mobile telephone A 110 makes a network call (encrypted) to token validation server 140 over network 99, sharing the decoded tokens, and allows the token validation server 140 to respond with the validity of the tokens. As with the first variation, the token from ATM B 120 is found (this time by token validation server 140) to have an invalid signature, and the token from ATM C 130 is found by the token validation server 140 to have a valid signature. In the second variation, the token verification server 140 transmits (via network 99), and the user mobile telephone A 110 receives (via network 99), the validation results.

The receiving device 110 determines a broadcasting device of the at least one audio frequency broadcasting devices 120 and 130, with which to establish a communications channel—Block 250. In a first variation of the Block 250 process, user mobile telephone A 110, had determined that the ATM B 120 may not be a trusted source based on an invalid token, but that ATM C 130 is a trusted source based on a valid token. Based on predefined logic, user mobile telephone A 110 rejects a pairing with ATM B 120 and selects pairing with ATM C 130.

In a second variation of the determining process of Block 250, user mobile telephone A 110 presents both "apple" (a human readable label for the token of ATM B 120) and "banana" (a human readable label for Device B's token) to the user via the user interface of user mobile telephone A 110. User mobile telephone A 110 also indicates, via the user interface of user mobile telephone A 110, that there is a discrepancy in the trustworthiness of the "apple" channel of ATM B 120. User mobile telephone A 110 receives input from the user to pair with ATM C 130. Note that in this second variation, the user could have chosen ATM B 120.

The receiving device generates a response token, which is a function of the token received from the determined device of Block 250—Block 260. In the continuing example, ATM C 130 generates a response token based on the token from ATM B 120. Where the response token is generated as a function of the received audio token, the received audio token can be an input parameter to an algorithm for determining the response token. In a simple example, the received audio token is an input to an adder adding (bitwise) a value to the received audio token or increasing signal amplitudes of the received audio token in order to generate an response token.

The receiving device broadcasts (encodes, modulates, and transmits) the generated response token in the broadcasting band of the determined device—Block 270. In the continuing example, user mobile telephone A 110 transmits the generated response token in the 10.0-15.0 kHz broadcasting band of ATM C 120, for example, after having determined in Block 250 in which broadcasting band the token received from the determined device (ATM C) has been transmitted.

The device receiving the broadcast response token demodulates and decodes the token, and upon determining that the token is valid, establishes the communication channel between the user device and the determined device—Block 280. In the continuing example, ATM C 130 receives the response token transmission from user mobile telephone A 110 and demodulates the transmission, decodes the token, determines that the decoded token is valid, and establishes an audio frequency sound communications channel between user mobile telephone A 110 and ATM C 130, for example, user mobile telephone A 110 is "tuned" to ATM C 130 channel, and the devices can communicate.

While in the example above, the receiving device 110 chose the channel and generated the response token, in some embodiments, either or both of channel choice and response token generation can be performed off the receiving device 110, for example, by the token verification server 140. In some examples, a radio frequency communications channel is established between the respective devices in Block 280.

Other Example Embodiments

FIG. 3 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The invention claimed is:

1. A computer-implemented method to establish a wireless communication channel between two computing devices, comprising:

listening, by a first device, for communication tokens across an audio bandwidth covering a transmit frequency of two or more broadcasting devices;

receiving, by the first device, communication tokens broadcast from the two or more broadcasting devices;

demodulating and decoding, by the first device, each received communication token;

validating, by one or more computing devices, each decoded communication token, the validating comprising determining whether a respective decoded communication token is found to have a valid signature from a trusted source;

determining, by the first device, a broadcasting device from the two or more broadcasting devices with which to establish a communications channel based at least in part on the validating of a respective communication token received from the broadcasting device, wherein the determining of the broadcasting device comprises:

presenting, by the first device, a validation result for each communication token from the two or more broadcasting devices to a user of the first device for selection of a particular broadcasting device corresponding to each communication token to pair with; and receiving, by the first device, from the user, a selection of the broadcasting device from the two or more broadcasting devices in response to the presenting of the validation results;

generating, by one or more computing devices, a response token as a function of the communication token received from the determined broadcasting device;

broadcasting, by the first device, the generated response token in an audio frequency response band of the determined broadcasting device;

demodulating, decoding, and validating, by the determined broadcasting device, the generated response token broadcast from the first device; and upon determining that the generated response token broadcast from the first device is valid, establishing, by the first device and the determined broadcasting device, a wireless communication channel between the first device and the determined broadcasting device.

2. The computer-implemented method of claim 1, wherein:
the listening comprises listening across the audio bandwidth of a plurality of the broadcasting devices, and each of at least two of the broadcasting devices respectively broadcasts in different bands.

3. The computer-implemented method of claim 1, wherein the one or more computing devices generating the response token is a token verification server, other than the first device, and the one or more computing devices are reachable from the first device via a radio frequency communications network.

4. The computer-implemented method of claim 1, wherein the one or more computing devices validating each decoded token is a token verification server, other than the first device, and the one or more computing devices are reachable from the first device via a radio frequency communications network.

5. The computer-implemented method of claim 1, wherein the wireless communication channel is a radio frequency communication channel.

6. The computer-implemented method of claim 1, wherein the wireless communication channel is an audio-based communication channel.

7. The computer-implemented method of claim 1, wherein the first device is a mobile user device and at least one of the two or more broadcasting devices is an ATM.

8. A non-transitory computer-readable storage device having instructions that, when executed by a computer, cause the computer to:
listen, by a first device, for communication tokens across an audio bandwidth covering a transmit frequency of two or more broadcasting devices;
receive, by the first device, at least two communication tokens broadcast from the two or more broadcasting devices;
demodulate and decode, by the first device, each received communication token;
validate, by one or more computing devices, each decoded communication token based at least in part on determining whether a respective decoded communication token is found to have a valid signature from a trusted source;
determine, by the first device, a broadcasting device from the two or more broadcasting devices with which to establish a communications channel based at least in part on the validating of a respective communication token received from the broadcasting device, wherein the determining of the broadcasting device comprises:
presenting, by the first device, a validation result for each communication token from the two or more broadcasting devices to a user of the first device for selection of a particular broadcasting device corresponding to each communication token to pair with; and
receiving, by the first device, from the user, a selection of the broadcasting device from the two or more broadcasting devices in response to the presenting of the validation results;
generate, by one or more computing devices, a response token as a function of the communication token received from the determined device;
broadcast, by the first device, the generated response token in an audio frequency response band of the determined device;
demodulate, decode, and validate, by the determined device, the generated response token broadcast from the first device; and
upon determining that the generated response token broadcast from the first device valid, establish, by the first device and the determined device, a wireless communication channel between the first device and the determined device.

9. The non-transitory computer-readable storage device of claim 8, wherein:
The listening comprises listening across the audio bandwidth of a plurality of broadcasting devices, and
each of at least two of the broadcasting devices respectively broadcasts in different bands.

10. The non-transitory computer-readable storage device of claim 8, wherein the one or more computing devices generating the response token is a token verification server, other than the first device, and the one or more computing devices are reachable from the first device via a radio frequency communications network.

11. The non-transitory computer-readable storage device of claim 8, wherein the one or more computing devices validating each decoded token is a token verification server, other than the first device, and the one or more computing devices are reachable from the first device via a radio frequency communications network.

12. The non-transitory computer-readable storage device of claim 8, wherein the wireless communication channel is a radio frequency communication channel or an audio-based communication channel.

13. The non-transitory computer-readable storage device of claim 8, wherein the first device is a mobile user device and at least one of the two or more broadcasting devices is an ATM.

14. A system to establish a wireless communication channel between two computing devices, the system comprising:
a storage device; and
at least one processor communicatively coupled to the storage device, wherein the at least one processor executes instructions from the storage device that cause the system to:
listen, by a first device, for communication tokens across an audio bandwidth covering a transmit frequency of two or more broadcasting devices;
receive, by the first device, communication tokens broadcast from the two or more broadcasting devices;
demodulate and decode, by the first device, each received communication token;
validate, by one or more computing devices, each decoded communication token based at least in part on determining whether a respective decoded communication token is found to have a valid signature from a trusted source;
determine, by the first device, a broadcasting device from the two or more broadcasting devices with which to establish a communications channel based at least in part on the validating of a respective communication token received from the broadcasting device, wherein the determining of the broadcasting device comprises:
presenting, by the first device, a validation result for each communication token from the two or more broadcasting devices to a user of the first device for selection of a particular broadcasting device corresponding to each communication token to pair with; and receiving, by the first device, from the user, a selection of the broadcasting device from the two or more broadcasting devices in response to the presenting of the validation results;

generate, by one or more computing devices, a response token as a function of the communication token received from the determined device;

broadcast, by the first device, the generated response token in an audio frequency response band of the determined device;

demodulate, decode, and validate, by the determined device, the generated response token broadcast from the first device; and upon determining that the generated response token broadcast from the first device valid, establish, by the first device and the determined device, a wireless communication channel between the first device and the determined device.

15. The system of claim 14, wherein:

the listening comprises listening across the audio bandwidth of a plurality of broadcasting devices, and each of at least two of the broadcasting devices respectively broadcasts in different bands.

16. The system of claim 14, wherein the one or more computing devices generating a response token is a token verification server, other than the first device, and the one or more computing devices are reachable from the first device via a radio frequency communications network.

17. The system of claim 14, wherein the one or more computing devices validating each decoded token is a token verification server, other than the first device, and the one or more computing devices are reachable from the first device via a radio frequency communications network.

18. The system of claim 14, wherein the wireless communication channel is a radio frequency communication channel or an audio-based communication channel.

* * * * *